United States Patent
Nishitsuji et al.

(10) Patent No.: US 8,231,106 B2
(45) Date of Patent: Jul. 31, 2012

(54) SYNCHRONOUS MOVING DEVICE AND IMAGE MEASURING APPARATUS

(75) Inventors: Yutaka Nishitsuji, Kobe (JP); Yoshiharu Kimura, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 345 days.

(21) Appl. No.: 12/755,751

(22) Filed: Apr. 7, 2010

(65) Prior Publication Data
US 2010/0258770 A1 Oct. 14, 2010

(30) Foreign Application Priority Data
Apr. 14, 2009 (JP) ................................. 2009-097582

(51) Int. Cl.
*B66F 3/08* (2006.01)
(52) U.S. Cl. ...................................... 254/98; 269/289 R
(58) Field of Classification Search .................... 254/98, 254/100, 134; 269/55, 56, 289 R; 29/281.1
See application file for complete search history.

(56) References Cited

U.S. PATENT DOCUMENTS

| | | | | |
|---|---|---|---|---|
| 7,438,286 B2 * | 10/2008 | Umahashi et al. | ............... | 269/21 |
| 7,476,072 B2 * | 1/2009 | Tamura | ...................... | 414/749.1 |
| 7,618,028 B2 * | 11/2009 | Huisken et al. | .................. | 269/63 |
| 7,963,512 B2 * | 6/2011 | Chang et al. | ..................... | 269/55 |
| 7,967,421 B2 * | 6/2011 | Kozuka et al. | ................... | 347/62 |
| 7,980,645 B2 * | 7/2011 | Ohtsuka et al. | .................... | 347/8 |
| 2003/0053045 A1 * | 3/2003 | Doering | ..................... | 356/237.1 |
| 2009/0002723 A1 * | 1/2009 | Kamiyama et al. | ........... | 356/625 |
| 2009/0188122 A1 * | 7/2009 | Nishitsuji et al. | ............... | 33/436 |
| 2011/0089621 A1 * | 4/2011 | Seidel | ............................. | 269/46 |

FOREIGN PATENT DOCUMENTS

| | | |
|---|---|---|
| JP | A-2001-224159 | 8/2001 |
| JP | A-2006-266748 | 10/2006 |

* cited by examiner

*Primary Examiner* — Branon Painter
(74) *Attorney, Agent, or Firm* — Oliff & Berridge, PLC

(57) ABSTRACT

A synchronous moving device includes: a device body; a movable portion which is provided in the device body; a feed screw shaft which is supported on the device body; a nut member which is thread-engaged with the feed screw shaft; a coupler which couples the movable portion and the nut member; and a cable binder which supports and guides a cable wired into the movable portion, wherein: the coupler includes a first member fixed to the movable portion, a second member fixed to the nut member, and an intermediate member interposed between the first and second members for absorbing deflecting motion of the feed screw shaft; and an end portion of the cable binder on a side of wiring of the cable into the movable portion is connected to the second member through a connection member and moved in synchronization with the movable portion.

4 Claims, 5 Drawing Sheets

SYNCHRONOUS MOVING DEVICE AND IMAGE MEASURING APPARATUS

CROSS-REFERENCE TO RELATED APPLICATIONS

This application is based upon and claims the benefit of priority from Japanese Patent Application No. 2009-097582, filed on Apr. 14, 2009, the entire contents of which are incorporated herein by reference.

BACKGROUND

1. Field of the Invention

The present invention relates to a synchronous moving device and an image measuring apparatus.

2. Description of the Related Art

There has been known an image measuring apparatus including a slider which is supported on a body of the apparatus so as to be movable, and an image capturing unit such as a CCD camera which is mounted in the slider, wherein an image of a subject to be measured is captured by the image capturing unit moved relative to the subject so that the shape or size of the subject is measured based on data of the captured image (e.g. see JP-A-2006-266748).

In such an image measuring apparatus, it is necessary to wire a cable into the movable slider for the purposes of feeding electric power to the image capturing unit mounted in the slider and exchanging signals (control, image data, etc.) with the image capturing unit. In the case where the cable is wired into such a movable slider (movable portion), a cable binder such as Cableveyor (registered trademark) capable of being bent following movement of the movable portion has been heretofore generally used for supporting and guiding the cable (e.g. see JP-A-2001-224159).

Cableveyor (registered trademark) has a structure in which one end (fixed end) is fixed to the apparatus body while the other end (movable end) is fixed to the movable portion. Accordingly, the behavior of Cableveyor accompanying its own movement, such as the influence of torsion of the cable and reaction force thereof, causes lowering of measurement accuracy because the behavior of Cableveyor is transmitted to the movable portion side (image capturing unit side).

SUMMARY

An object of the invention is to provide a synchronous moving device which is hardly affected by the behavior of a cable binder accompanying its own movement to make it possible to prevent measurement accuracy from being lowered, and an image measuring apparatus provided with the synchronous moving device.

According to an aspect of the invention, there is provided a synchronous moving device including: a device body; a movable portion which is provided in the device body so as to be movable; a feed screw shaft which is supported on the device body so as to be rotatable and which moves the movable portion; a nut member which is thread-engaged with the feed screw shaft; a coupler which couples the movable portion and the nut member; and a cable binder which supports and guides a cable wired into the movable portion, wherein: the coupler includes a first member fixed to the movable portion, a second member fixed to the nut member, and an intermediate member interposed between the first and second members for absorbing deflecting motion of the feed screw shaft in a plane orthogonal to an axis of the feed screw shaft; and an end portion of the cable binder on a side of wiring of the cable into the movable portion is connected to the second member through a connection member and moved in synchronization with the movable portion.

Here, a feed screw mechanism for moving the movable portion is made from the feed screw shaft and the nut member. A ball screw mechanism can be exemplified as an instance of the feed screw mechanism. In this configuration, when the feed screw shaft is rotated, the movable portion is moved through the nut member thread-engaged with the feed screw shaft and the coupler. Because the coupler includes the first member fixed to the movable portion, the second member fixed to the nut member, and the intermediate member interposed between the first and second members for absorbing deflecting motion of the feed screw shaft in a plane orthogonal to the axis of the feed screw shaft, the intermediate member of the coupler absorbs the deflecting motion (deflection) caused by rotation of the feed screw shaft. Accordingly, because the deflecting motion (deflection) caused by rotation of the feed screw shaft is not transmitted to the movable portion, accurate feeding can be expected.

Since a movable end of the cable binder, that is, the end portion of the cable binder on a side of wiring of the cable into the movable portion, is connected to the second member of the coupler through the connection member, the movable end of the cable binder is also moved following the movement of the movable portion. Even when the behavior of the cable binder accompanying its own movement is transmitted to the second member on this occasion, the intermediate member absorbs the behavior of the cable binder as well as the deflecting motion. Accordingly, the influence of the deflecting motion of the feed screw shaft on the movable portion and the influence of the behavior of the cable binder accompanying its own movement on the movable portion can be suppressed simultaneously. Accordingly, measurement accuracy can be prevented from being lowered.

The connection member may be a wire. According to this configuration, the direction of extension of the wire can be changed relatively easily when the cable binder and the second member are connected to each other by the wire. Accordingly, the cable binder and the second member can be connected to each other in accordance with the positions of the movable portion and the cable binder relative to the device body. In addition, the space of installation can be reduced, compared with the case where a belt or chain is disposed.

The synchronous moving device may further includes: a guide rail which is provided on the device body so as to be parallel with a direction of movement of the movable portion; and a support plate which is provided so as to be movable along the guide rail, wherein the end portion of the cable binder is fixed to the support plate. According to the configuration, the direction of movement of the end portion of the cable binder is guided by the support plate and the guide rail, so that the end portion of the cable binder can be slid smoothly because torsion of the cable is rarely generated and the influence of reaction force thereof is a little.

According to another aspect of the invention, there is provided an image measuring apparatus including: a synchronous moving device comprising: a device body; a movable portion which is provided in the device body so as to be movable; a feed screw shaft which is supported on the device body so as to be rotatable and which moves the movable portion; a nut member which is thread-engaged with the feed screw shaft; a coupler which couples the movable portion and the nut member; and a cable binder which supports and guides a cable wired into the movable portion, wherein: the coupler includes a first member fixed to the movable portion, a second member fixed to the nut member, and an intermediate member interposed between the first and second members for absorbing deflecting motion of the feed screw shaft in a plane orthogonal to an axis of the feed screw shaft; and an end portion of the cable binder on a side of wiring of the cable into the movable portion is connected to the second member through a connection member and moved in synchronization with the movable portion; a stage on which a subject to be measured is put; an image capturing unit which is provided in the movable portion for capturing an image of the subject; and a moving mechanism which moves the subject and the image capturing unit relative to each other, wherein the shape or size of the subject is measured based on data of the image captured by the image capturing unit. In this configuration, when the image capturing unit provided in the movable portion is moved by the feed screw mechanism of the synchronous moving device, the end portion (movable end) of the cable binder can be also moved following the image capturing unit. On this occasion, because both the deflecting motion of the feed screw shaft and the behavior of the cable binder accompanying its own movement are not transmitted to the movable portion by the coupler in the same manner as the synchronous moving device, improvement in measurement accuracy can be attained.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

An embodiment of the invention is an example in which the invention is applied to an image measuring apparatus.

Figure 1:
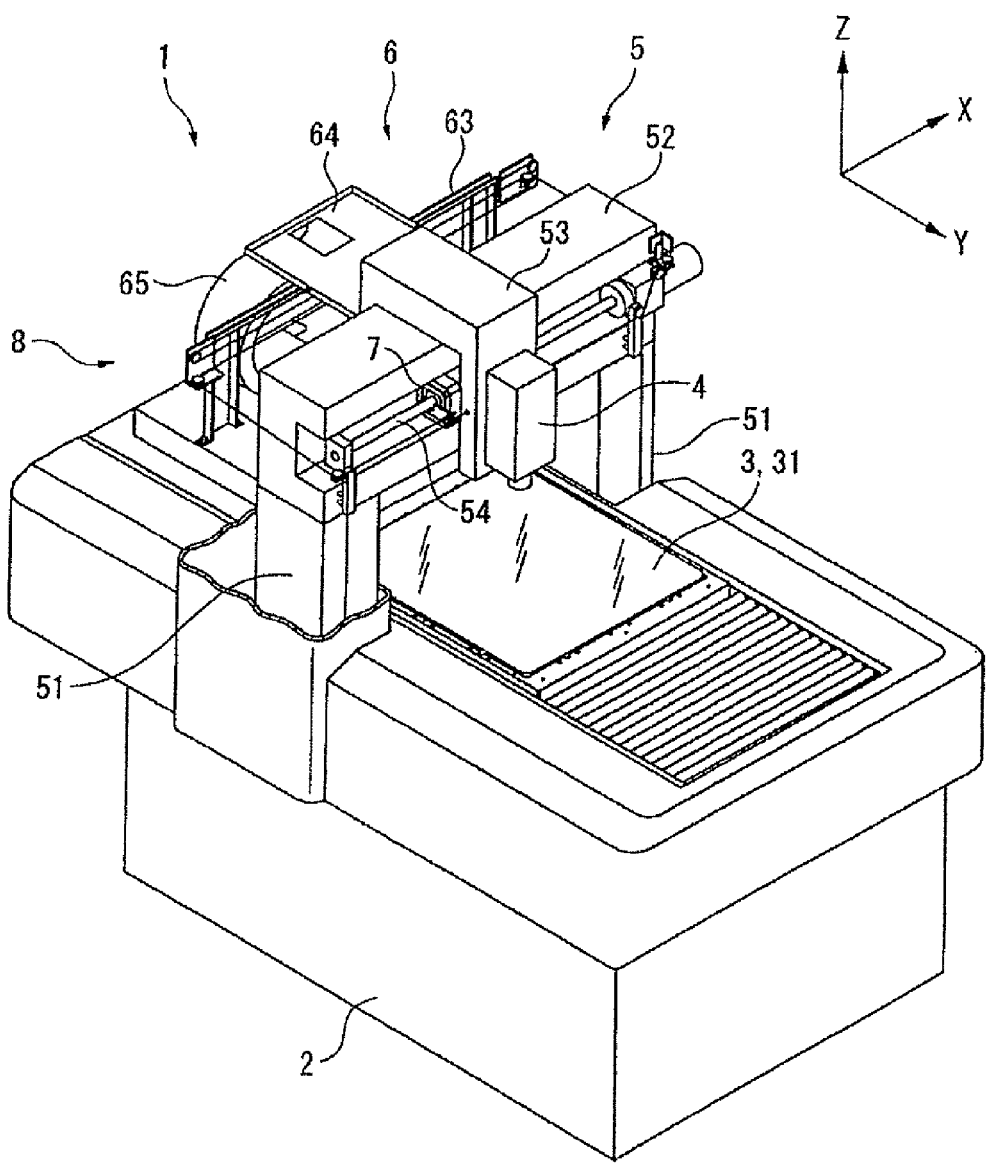
FIG. 1 is an overall perspective view of an image measuring apparatus according to an embodiment of the invention.

As shown in FIG. 1, an image measuring apparatus 1 according to the embodiment includes a pedestal 2, a stage 3, an optical device 4, a moving mechanism 5, a cable support mechanism 6, and a synchronizing mechanism 8. The pedestal 2 serves as a body of the apparatus. The stage 3 is provided on an upper surface of the pedestal 2 so as to be movable in a Y-axis direction. A subject to be measured is put on the stage 3. The optical device 4 serves as an image capturing unit which captures an image of the subject. The moving mechanism 5 moves the optical device 4 in two-dimensional directions (an X-axis direction and a Z-axis direction). The cable support mechanism 6 supports and guides a cable through which electric power is fed to the optical device 4 and signals (such as control, image data, etc.) are exchanged with the optical device 4. The synchronizing mechanism 8 moves the cable support mechanism 6 interlockingly in synchronization with the movement of the optical device 4 in the X-axis direction.

Although the detailed structure of the stage 3 is not shown, the stage 3 includes a body frame, and a slide glass 31. The body frame is driven in the Y-axis direction by a drive mechanism. The slide glass 31 is fixed on the body frame. A subject to be measured is mounted on the slide glass 31. The optical device 4 is composed of a CCD camera. The moving mechanism 5 includes a pair of beam supports 51, an X-axis beam 52, an X-slider 53, and a ball screw mechanism 54. The pair of beam supports 51 are provided vertically on opposite sides of the pedestal 2 between which the stage 3 is disposed. The X-axis beam 52 is disposed between upper ends of the beam supports 51 so as to be parallel with an X-axis direction. The X-slider 53 serves as a movable portion which is supported so as to be movable along the X-axis beam 52. The ball screw mechanism 54 serves as a feed screw mechanism which feeds the X-slider 53 in the X-axis direction. Incidentally, a Z-slider is not shown but provided in the X-slider 53 so as to be movable in the Z-axis direction. The optical device 4 is attached to the Z-slider.

Figure 2:
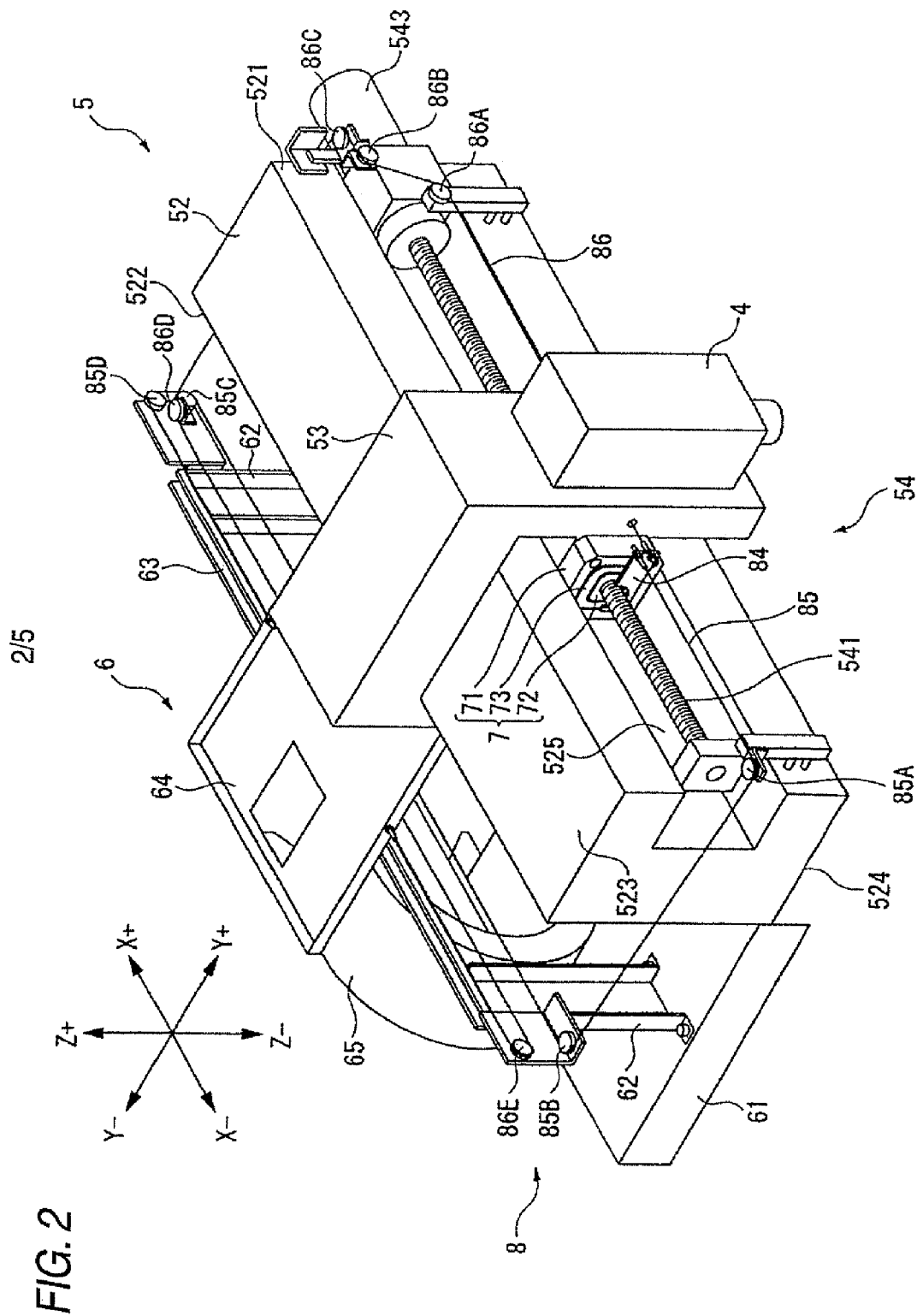
FIG. 2 is a perspective view showing a moving mechanism of the image measuring apparatus according to the embodiment.

As shown in FIG. 2, the X-axis beam 52 has a pair of side surfaces 521 and 522 orthogonal to a Y-axis direction, upper and lower surfaces 523 and 524 orthogonal to a Z-axis direction, and a groove portion 525 formed along the X-axis direction in the side surface 521, so that the X-axis beam 52 is U-shaped in sectional view. As shown in FIG. 2, the X-slider 53 is substantially U-shaped so that three surfaces of the X-axis beam 52, i.e. the pair of side surfaces 521 and 522 and the upper surface 523, are covered with the X-slider 53. The X-slider 53 is supported by an air bearing with respect to these three surfaces and provided so as to be movable in the X-axis direction.

Figure 3:
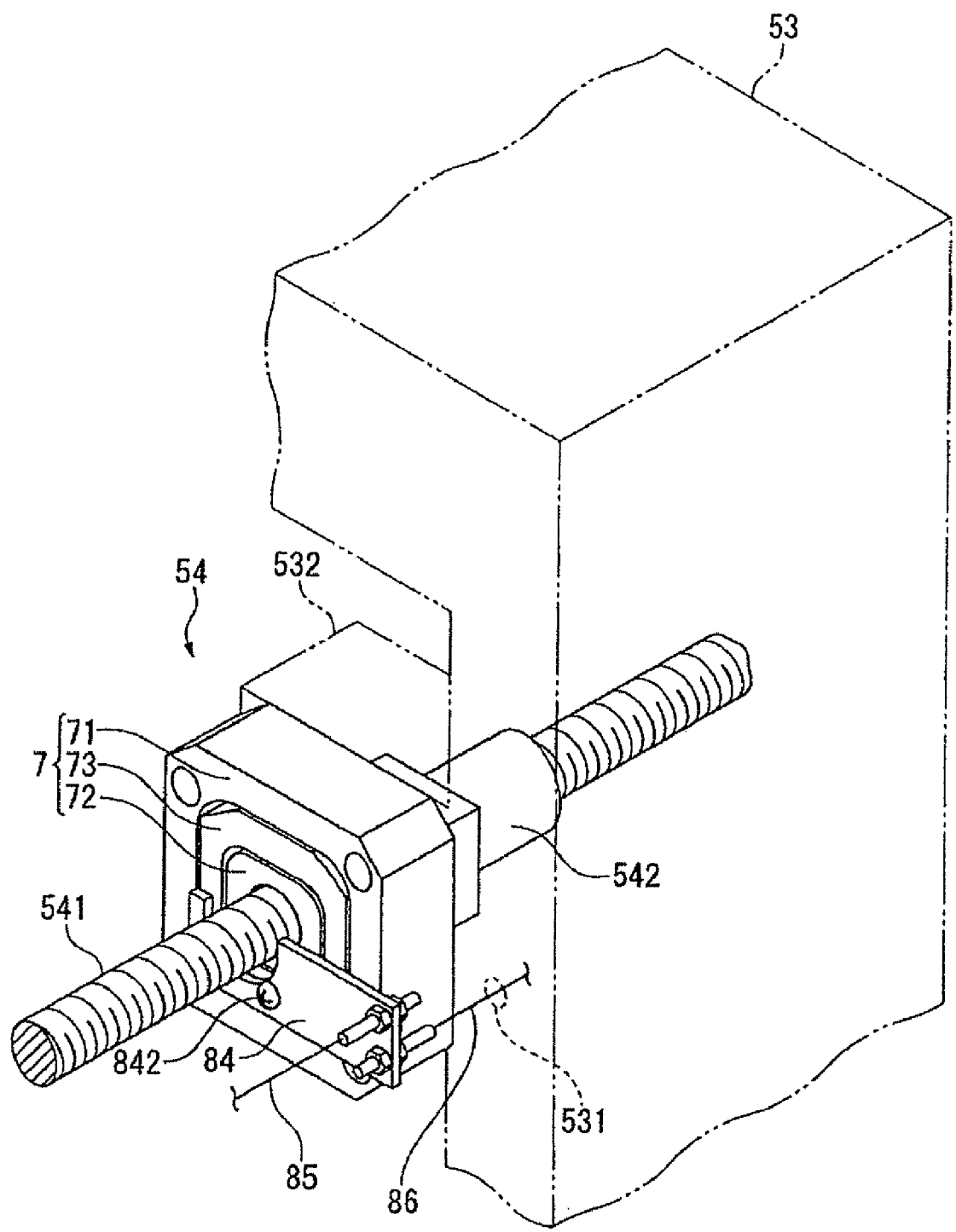
FIG. 3 is an enlarged partial perspective view showing a feed screw mechanism in the moving mechanism in this embodiment.

As shown in FIGS. 2 and 3, the ball screw mechanism 54 has a feed screw shaft 541, a nut member 542, a floating unit 7 and a motor 543. The feed screw shaft 541 is supported inside the groove portion 525 of the X-axis beam 52 so as to be parallel with and rotatable along the X-axis direction. The nut member 542 is thread-engaged with the feed screw shaft 541. The floating unit 7 serves as a coupler which couples the nut member 542 and the X-slider 53. The motor 543 rotates the feed screw shaft 541. When the feed screw shaft 541 is rotated by the motor 543, the X-slider 53 is moved in the X-axis direction through the nut member 542 thread-engaged with the feed screw shaft 541 and the floating unit 7.

Figure 4:
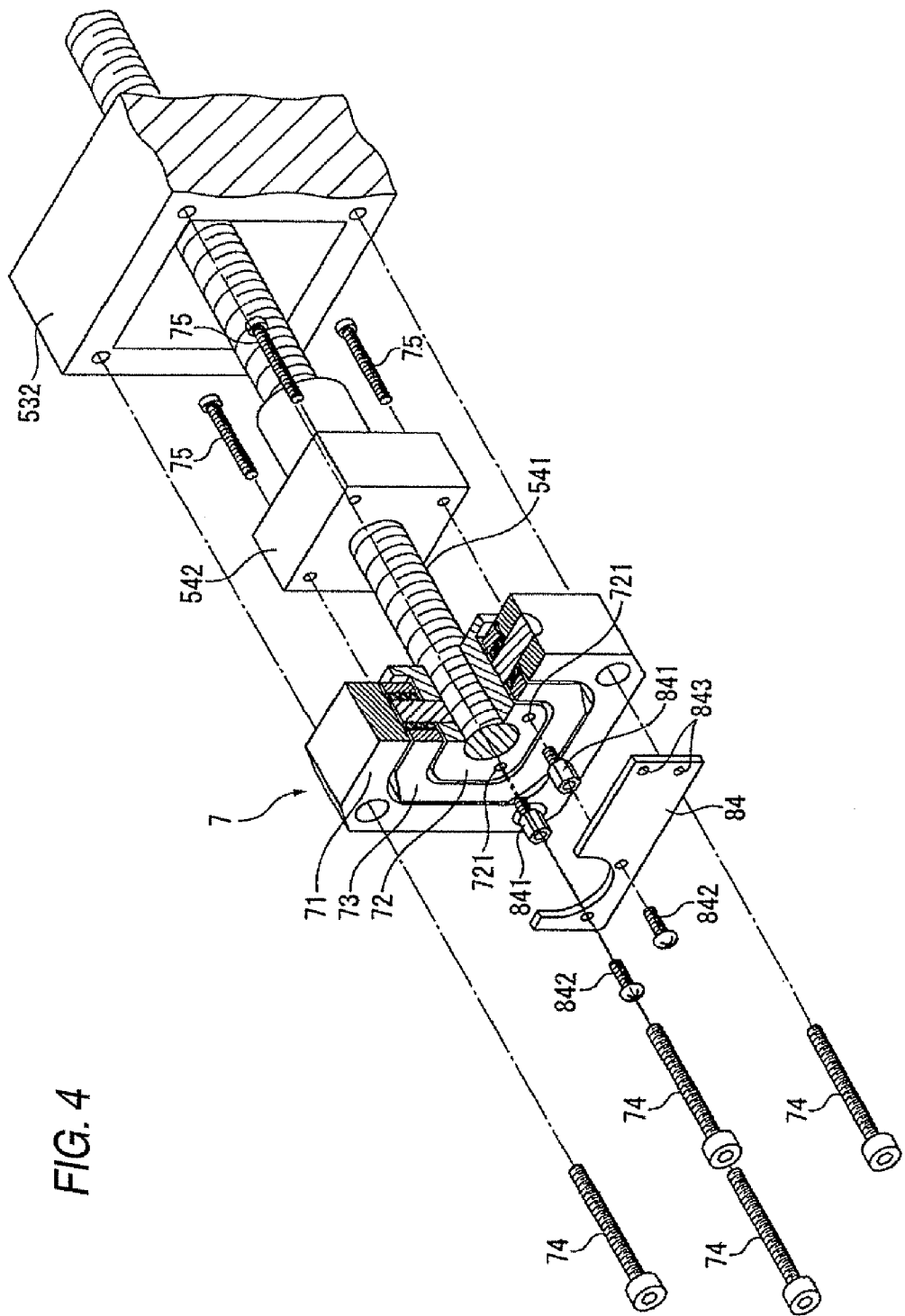
FIG. 4 is an exploded view of the feed screw mechanism shown in FIG. 3.
Figure 5:
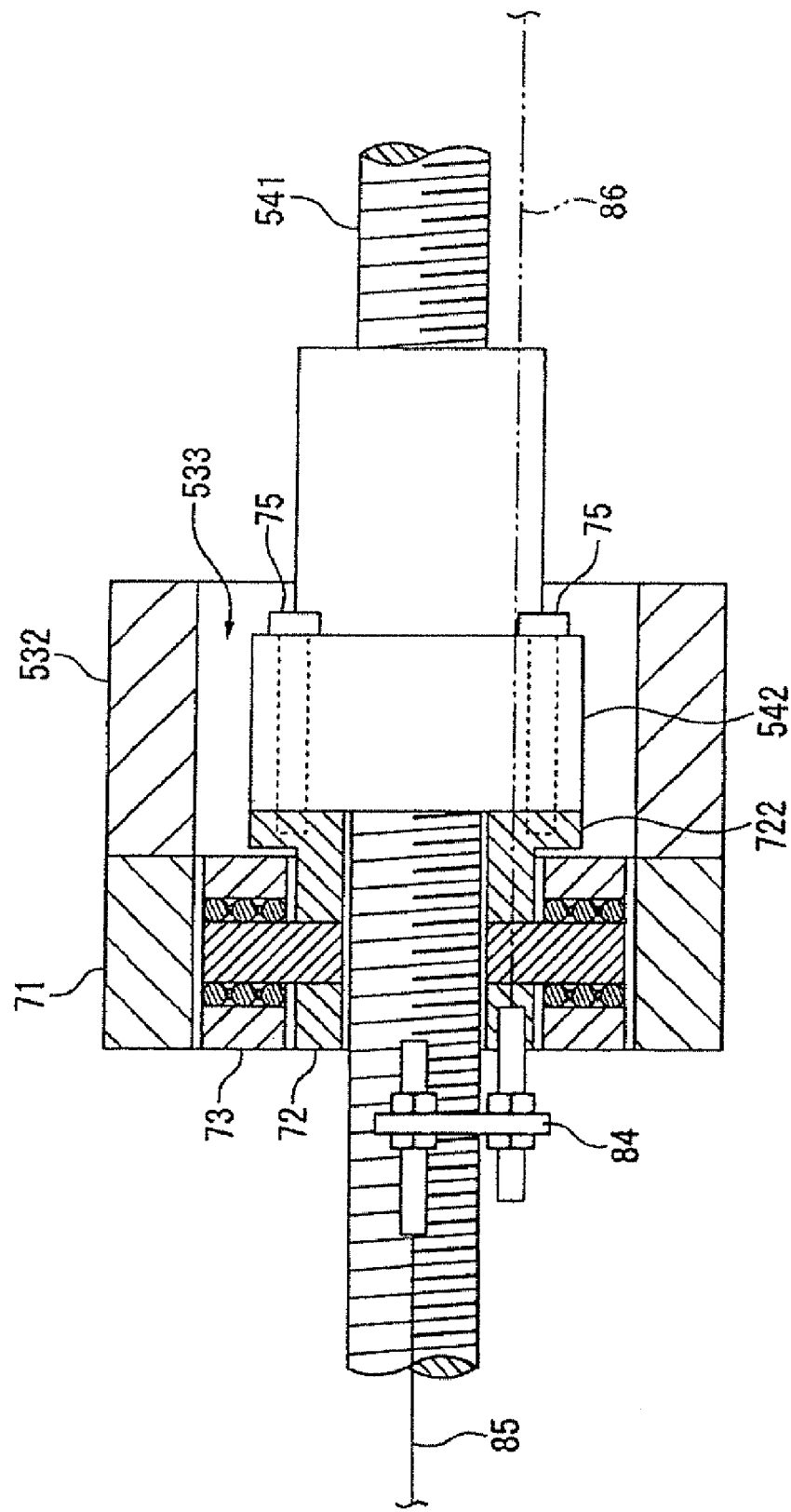
FIG. 5 is a sectional view of a connection portion between the movable portion of the moving mechanism and the feed screw mechanism in this embodiment.

As shown in FIGS. 3 to 5, the floating unit 7 is formed as a triple structure including a first member 71, a second member 72, and an intermediate member 73. The first member 71 is fixed to an attachment portion 532 by four bolts 74 (FIG. 4). The attachment portion 532 is formed inside the X-slider 53 so as to be integrated with the X-slider 53. The second member 72 is fixed to the nut member 542 by four bolts 75 while the feed screw shaft 541 is inserted into the center portion of the second member 72. The intermediate member 73 is interposed between the first and second members 71 and 72 for transmitting axial movement of the second member 72 to the first member 71 while absorbing deflecting motion of the feed screw shaft 541 in a plane orthogonal to the axis of the feed screw shaft 541. That is, because the second member 72 is formed so as to be able to be displaced in the Z-axis direction relative to the intermediate member 73 through a stroke bearing mechanism while the intermediate member 73 is formed so as to be able to be displaced in the Y-axis direction relative to the first member 71 through the stroke bearing mechanism, there is provided a structure in which the intermediate member 73 absorbs deflecting motion of the feed screw shaft 541 so that only thrust of the ball screw mechanism 54 is transmitted to the X-slider 53.

As shown in FIG. 5, the attachment portion 532 of the X-slider 53 which fixes the first member 71 is provided side by side with the first member 71 in the axial direction of the feed screw shaft 541 and has a storage space 533 in its inside so that the nut member 542 is stored in the storage space 533. The nut member 542 is provided side by side with the second member 72 in the axial direction and coupled to a flange portion 722 which is formed in an end portion of the second member 72.

As shown in FIG. 2, the cable support mechanism 6 has a support base 61, a guide rail 63, a support plate 64, and a cable binder 65. The support base 61 is fixed to the X-axis beam 52. The guide rail 63 is supported on the support base 61 through support legs 62 so as to be parallel with the X-axis direction. The support plate 64 is provided so as to be movable along the guide rail 63. The cable binder 65 has a base end (fixed end) end fixed to the support base 61, and a leading end (movable end) fixed to the support plate 64. The cable binder 65 is provided for supporting and guiding a cable (not shown) wired into the X-slider 53. The cable binder 65 is formed so that the cable is held inside the cable binder 65, and that the movable end of the cable binder 65 can be bent and restored with the fixed end as a fulcrum. In this example, the cable binder 65 is made of Cableveyor (registered trademark). The cable (not shown) supported by the cable binder 65 is wired along the inside or lower surface of the support plate 64 from a power supply through the cable binder 65, and then connected to the optical device 4. In this manner, while electric power is fed to the optical device 4 through the cable, signals are exchanged with the optical device 4 through the cable.

As shown in FIG. 2, the synchronizing mechanism 8 has a wire fixation member 84, a first wire 85, and a second wire 86. The wire fixation member 84 is fixed to the second member 72 of the floating unit 7. The first wire 85 serves as a connection member which has one end coupled to the wire fixation member 84, and the other end coupled to a right side (right side in FIG. 2) of the support plate 64 of the cable support mechanism 6. The second wire 86 serves as a connection member which has one end coupled to the wire fixation member 84, and the other end coupled to a left side (left side in FIG. 2) of the support plate 64 of the cable support mechanism 6.

As shown in FIG. 4, the wire fixation member 84 is fastened to the second member 72 by screws 842 through two spacers 841. The two spacers 841 are thread-engaged with tap portions 721 (two places) formed in the second member 72. In addition, attachment holes 843 (two places) for fixing the wires 85 and 86 are formed in the wire fixation member 84 so that end portions of the wires and 86 are coupled into the attachment holes 843 respectively.

A revolving loop of the first and second wires 85 and 86 will be described on the assumption that a right direction (upper right direction in FIG. 2) is designated as X+, a left direction (lower left direction in FIG. 2) is designated as X−, a front direction (lower right direction in FIG. 2) is designated as Y+, a rear direction (upper left direction in FIG. 2) is designated as Y−, an up direction (up direction in FIG. 2) is designated as Z+, and a down direction (down direction in FIG. 2) is designated as Z− in FIG. 2. After the first wire 85 is extended in the X− direction from the wire fixation member 84, the first wire 85 is turned to the Y− direction through a pulley 85A at an end portion of the feed screw shaft 541. Then, the first wire 85 is turned to the X+ direction through a pulley 85B in the rear in the Y-axis direction and further turned to the X− direction through pulleys 85C and 85D at an end portion in the X-axis direction. Then, the first wire 85 is connected to the right side of the support plate 64. Accordingly, when the X-slider 53 is moved to the right direction (X+) in FIG. 2, the support plate 64 (the movable end of the cable binder 65) is also moved to the right direction (X+) in FIG. 2.

After the second wire 86 is extended in the X+ direction from the wire fixation member 84, the second wire 86 is turned to the Y− direction through pulleys 86A, 86B and 86C at an end portion of the feed screw shaft 541. Then, the second wire 86 is turned to the X− direction through a pulley 86D in the rear in the Y-axis direction and further turned to the X+ direction through a pulley 86E at an end portion in the X-axis direction. Then, the second wire 86 is connected to the left side of the support plate 64. Accordingly, when the X-slider 53 is moved to the left direction (X−) in FIG. 2, the support plate 64 (the movable end of the cable binder 65) is also moved to the left direction (X−) in FIG. 2. Incidentally, a wire insertion hole 531 is formed along the X-axis direction in the X-slider 53 so that the wire 86 extend along the feed screw shaft 541 is inserted into the wire insertion hole 531.

In such a configuration, after a subject to be measured is put on the slide glass 31, an image of the subject is captured by the optical device 4 while the optical device 4 is moved in accordance with a measurement region of the subject. When the feed screw shaft 541 is rotated on this occasion, the X-slider 53 is moved through the nut member 542 thread-engaged with the feed screw shaft 541 and the floating unit 7. Since the floating unit 7 includes the first member 71 fixed to the X-slider 53, the second member 72 fixed to the nut member 542, and the intermediate member 73 interposed between the first and second members 71 and 72 for absorbing deflecting motion of the feed screw shaft 541 in a plane orthogonal to the axis of the feed screw shaft 541, deflecting motion (deflection) occurring due to rotation of the feed screw shaft 541 is absorbed by the intermediate member 73 of the floating unit 7. Accordingly, accurate feeding can be expected because deflecting motion (deflection) occurring due to rotation of the feed screw shaft 541 is not transmitted to the X-slider 53.

At the same time, the movable end of the cable binder 65 is also moved together because the support plate 64 coupled to the X-slider 53 through the floating unit 7, the first wire 85 and the second wire 86 is also moved in the same direction as the X-slider 53. On this occasion, though the behavior of the movable end of the cable binder 65 is applied on the second member 72 of the floating unit 7 through the first wire 85 and the second wire 86, the intermediate member 73 absorbs the behavior of the movable end of the cable binder 65 as well as the deflecting motion of the feed screw shaft 541. Accordingly, both the influence of the deflecting motion of the feed screw shaft 541 on the X-slider 53 and the influence of the behavior of the cable binder 65 accompanying its own movement on the X-slider 53 can be suppressed simultaneously.

According to the above embodiment, when the X-slider 53 is moved in accordance with rotation of the feed screw shaft 541 of the ball screw mechanism 54, the movable end of the cable binder 65 is also moved in synchronization with the X-slider 53 through the synchronizing mechanism 8. Accordingly, the movable end of the cable binder 65 can be moved following the movement of the X-slider 53.

According to the above embodiment, the floating unit 7 which couples the nut member 542 of the ball screw mechanism 54 and the X-slider 53 has a structure to have the first member 71 fixed to the X-slider 53, the second member 72 coupled to the nut member 542, and the intermediate member 73 interposed between the first and second members 71 and 72 for transmitting axial displacement of the second member 72 to the first member 71 in a state in which the intermediate member 73 can be displaced in the Y-axis and Z-axis directions relative to the first and second members 71 and 72. Accordingly, deflecting motion (deflection) occurring due to rotation of the feed screw shaft 541 can be absorbed by the intermediate member 73.

In addition, according to the above embodiment, the movable end of the cable binder 65 is coupled to the second member 72 of the floating unit 7 through the first and second wires 85 and 86. Accordingly, the behavior of the movable end of the cable binder 65 can be absorbed by the intermediate member 73. Accordingly, because both the influence of the deflecting motion of the feed screw shaft 541 on the X-slider 53 and the influence of the behavior of the cable binder 65 accompanying its own movement on the X-slider 53 can be suppressed simultaneously, measurement accuracy can be prevented from being lowered.

According to the above embodiment, the guide rail 63 is provided in parallel with the direction of movement of the X-slider 53 through the support base 61 in the X beam 52. The support plate 64 is provided so as to be movable along the guide rail 63. The movable end of the cable binder 65 is fixed to the support plate 64. That is, the direction of movement of the movable end of the cable binder 65 is guided by the support plate 64 and the guide rail 63. Accordingly, the movable end of the cable binder 65 can be slid smoothly because torsion of the cable is rarely generated and the influence of reaction force thereof is a little.

In addition, according to the above embodiment, since the support plate 64 to which the leading end of the cable binder 65 is fixed and the second member 72 of the floating unit 7 are connected to each other by the first and second wires 85 and 86, the directions of extension of these wires 85 and 86 can be changed relatively easily. Accordingly, the support plate 64 and the second member 72 can be connected to each other in accordance with the relative positions of the X-slider 53 and the cable binder 65. The space of installation can be reduced compared with the case where a belt or chain is disposed.

According to the above embodiment, the ball screw mechanism 54 capable of performing accurate positioning with small frictional loss is used for driving the X-slider 53, and the floating unit 7 is provided for absorbing deflecting motion. Accordingly, measurement accuracy can be kept high and shortening of measuring time can be attained even when the output of the motor 543 is taken large to increase acceleration of the X-slider 53.

The invention is not limited to the embodiment but may include modifications, improvements, etc. as long as the object of the invention can be achieved. For example, although the embodiment has been described in the case where the ball screw mechanism is used as the feed screw mechanism by way of example, any other feed screw mechanism than the ball screw mechanism may be used as long as the feed screw mechanism has a feed screw shaft and a nut member for moving the X-slider. In addition, although the embodiment has been described in the case where the wire fixation member 84 is used for connecting the wires 85 and 86 to the second member 72, the invention is not limited thereto. For example, the wires 85 and 86 may be connected to the second member 72 by another method.

The invention is not limited to the case where the synchronous moving device according to the invention is used in the aforementioned image measuring apparatus. For example, the synchronous moving device may be used in another measuring apparatus. Or the invention may be applied to a machine tool in which a spindle and a motor for rotating the spindle are mounted in the movable portion and the cable binder for feeding electric power to the motor is provided so as to be capable of following the movable portion.

The invention can be used widely in an image measuring apparatus and a synchronous moving device which can move the cable binder in synchronization with the movable portion.

What is claimed is:

1. A synchronous moving device comprising:
a device body;
a movable portion which is provided in the device body so as to be movable;
a feed screw shaft which is supported on the device body so as to be rotatable and which moves the movable portion;
a nut member which is thread-engaged with the feed screw shaft;
a coupler which couples the movable portion and the nut member; and
a cable binder which supports and guides a cable wired into the movable portion, wherein:
the coupler includes a first member fixed to the movable portion, a second member fixed to the nut member, and an intermediate member interposed between the first and second members for absorbing deflecting motion of the feed screw shaft in a plane orthogonal to an axis of the feed screw shaft; and
an end portion of the cable binder closest to the moveable portion is connected to the second member through a connection member and moved in synchronization with the movable portion.

2. The synchronous moving device according to claim 1, wherein
the connection member is a wire.

3. The synchronous moving device according to claim 1, further comprising:
a guide rail which is provided on the device body so as to be parallel with a direction of movement of the movable portion; and
a support plate which is provided so as to be movable along the guide rail, wherein
the end portion of the cable binder is fixed to the support plate.

4. An image measuring apparatus comprising:
a synchronous moving device comprising: a device body; a movable portion which is provided in the device body so as to be movable; a feed screw shaft which is supported on the device body so as to be rotatable and which moves the movable portion; a nut member which is thread-engaged with the feed screw shaft; a coupler which couples the movable portion and the nut member; and a cable binder which supports and guides a cable wired into the movable portion, wherein: the coupler includes a first member fixed to the movable portion, a second member fixed to the nut member, and an intermediate member interposed between the first and second members for absorbing deflecting motion of the feed screw shaft in a plane orthogonal to an axis of the feed screw shaft; and an end portion of the cable binder closest to the moveable portion is connected to the second member through a connection member and moved in synchronization with the movable portion;
a stage on which a subject to be measured is put;
an image capturing unit which is provided in the movable portion for capturing an image of the subject; and
a moving mechanism which moves the subject and the image capturing unit relative to each other, wherein the shape or size of the subject is measured based on data of the image captured by the image capturing unit.

* * * * *